(12) United States Patent
Boodaghians et al.

(10) Patent No.: US 9,458,028 B2
(45) Date of Patent: Oct. 4, 2016

(54) MIXED FLUID FILTRATION SYSTEM

(71) Applicant: MAG AEROSPACE INDUSTRIES, INC., Carson, CA (US)

(72) Inventors: Razmik B. Boodaghians, Glendal, CA (US); Kevin Huang, Los Angeles, CA (US); Christina Ortolan, Long Beach, CA (US); Timothy Birbeck, Torrence, CA (US); Nguyen Tram, Chino Hills, CA (US); Christoph Goeschel, Seattle, WA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 14/081,089

(22) Filed: Nov. 15, 2013

(65) Prior Publication Data

US 2014/0138326 A1    May 22, 2014

Related U.S. Application Data

(60) Provisional application No. 61/727,371, filed on Nov. 16, 2012, provisional application No. 61/729,225, filed on Nov. 21, 2012.

(51) Int. Cl.
*B01D 29/66* (2006.01)
*C02F 1/00* (2006.01)
*C02F 103/00* (2006.01)

(52) U.S. Cl.
CPC ......... *C02F 1/001* (2013.01); *C02F 2103/002* (2013.01); *C02F 2201/001* (2013.01); *C02F 2201/005* (2013.01); *C02F 2301/063* (2013.01); *C02F 2303/02* (2013.01); *C02F 2303/04* (2013.01); *C02F 2303/16* (2013.01)

(58) Field of Classification Search
CPC combination set(s) only.
See application file for complete search history.

(56) References Cited

U.S. PATENT DOCUMENTS

| 4,080,294 A | * | 3/1978 | Edwards et al. ............... 210/232 |
| 4,464,255 A | * | 8/1984 | Ueda ............................. 210/136 |
| 4,486,307 A | | 12/1984 | Weiler |
| 4,713,847 A | * | 12/1987 | Oldfelt et al. .................... 4/316 |

(Continued)

FOREIGN PATENT DOCUMENTS

| EP | 0363012 A1 | 4/1990 |
| EP | 1698735 A1 | 9/2006 |

(Continued)

OTHER PUBLICATIONS

PCT/US2013/070267, International Search Report and Written Opinion dated Jul. 18, 2014, 9 pages.

(Continued)

*Primary Examiner* — Krishnan S Menon
*Assistant Examiner* — Ryan B Huang
(74) *Attorney, Agent, or Firm* — Kilpatrick Townsend & Stockton LLP; Dean W. Russell; Kristin M. Crall

(57) ABSTRACT

Embodiments of the present invention provide a filtration system that can be used to filter debris-laden water and to systems for cleaning the filtration system using a vacuum flush system to create a backwash flow through the filter of the filtration system. The filtration system described finds particular use on-board passenger transport vehicles that have a vacuum waste system, such as aircraft. The filtration system provides the ability to collect, treat, and reuse liquid resources in an environment with a vacuum waste system.

20 Claims, 8 Drawing Sheets

(56) References Cited

U.S. PATENT DOCUMENTS

| | | | | |
|---|---|---|---|---|
| 5,133,853 | A | * | 7/1992 | Mattsson et al. ............ 210/104 |
| 5,462,675 | A | * | 10/1995 | Hopkins et al. ............ 210/767 |
| 5,759,387 | A | * | 6/1998 | Wilkes .................... 210/139 |
| 6,325,356 | B1 | | 12/2001 | Rozenblatt |
| 7,533,426 | B2 | | 5/2009 | Pondelick |
| 2004/0124127 | A1 | * | 7/2004 | Fox et al. .................. 210/169 |
| 2007/0102370 | A1 | * | 5/2007 | Hoffjann et al. ............ 210/748 |
| 2009/0074518 | A1 | | 3/2009 | Mueller et al. |
| 2012/0051977 | A1 | | 3/2012 | Boodaghians et al. |
| 2012/0199220 | A1 | * | 8/2012 | Knepp et al. ................ 137/558 |
| 2013/0146783 | A1 | | 6/2013 | Boodaghians et al. |
| 2013/0305444 | A1 | | 11/2013 | Boodaghians et al. |
| 2014/0020167 | A1 | | 1/2014 | Rieger et al. |

FOREIGN PATENT DOCUMENTS

| | | | |
|---|---|---|---|
| EP | 2690015 A1 | | 1/2014 |
| FI | 0363012 A1 | * | 4/1990 |
| WO | 03/004785 A1 | | 1/2003 |
| WO | 2013/172953 | | 11/2003 |

OTHER PUBLICATIONS

International Search Report and Written Opinion dated Sep. 16, 2013 in Application No. PCT/US2013/031224.

U.S. Appl. No. 61/714,912, filed Oct. 17, 2012.

International Patent Application No. PCT/US2013/070267, International Preliminary Report on Patentability dated May 28, 2015.

\* cited by examiner

MIXED FLUID FILTRATION SYSTEM

CROSS REFERENCE TO RELATED APPLICATIONS

This application claims the benefit of U.S. Provisional Application Ser. No. 61/727,371, filed Nov. 16, 2012, titled "Hybrid Grey Water Filtration Device" and of U.S. Provisional Application Ser. No. 61/729,225, filed Nov. 21, 2012, titled "Toilet Concepts," the entire contents of each of which are hereby incorporated by reference.

FIELD OF THE INVENTION

Embodiments relate generally to a filtration system that can be used to filter debris-laden water and to systems for cleaning the filtration system using a vacuum flush system to create a backwash flow through the filtering component of the filtration system. The filtration system described finds particular use on-board passenger transport vehicles that have a vacuum waste system, such as aircraft. The filtration system provides the ability to collect, treat, and reuse liquid resources in an environment with a vacuum waste system.

BACKGROUND

Water weight makes up the majority of the total net weight of potable water systems on-board aircraft and other passenger transport vehicles. During aircraft takeoff, this weight becomes particularly expensive in terms of fuel requirements. There exists a large incentive to reduce this weight. However, potable water is required for lavatory and galley uses. In the lavatory, potable water is required to wash users' hands, but potable water is also used for the toilet flushing. It is desirable to provide a way to re-use the spent water from the hand-washing process on-board. During the hand washing process, after the potable water exits the faucet for rinsing the user's hands, the spent water (also referred to as "grey water") is considered waste and is typically discharged overboard or introduced to the waste system.

While the water being dispensed from the faucet is scrutinized by regulatory agencies for quality and health standards, the water used to flush the toilet is not under the same restrictions. There are no regulations preventing the use of this sink discharge, the "grey water," for flushing the toilet. There may be other on-board uses for the grey water as well. Ground-based uses of collected grey water include flushing toilets, watering gardens, and other non-potable consumptions of water. However, these collection and re-use systems are ill-suited for aircraft installation due to health, structural, and environmental requirements.

BRIEF SUMMARY

Embodiments of the invention described herein thus provide a mixed fluid filtration system. In one aspect, the filtration system is designed for aircraft non-potable reuse of grey water, but the functions and features described herein may be used in other instances for filtration of any other type of mixed fluid. Embodiments also provide a method for cleaning a filter of a mixed fluid filtration system using a vacuum system. The vacuum system may pull filtered water back into the filter (i.e., via backwashing) and into the vacuum waste system. This may help remove any debris or other solids from an inner surface of the filter media without having to remove and manually clean, scrape, or pressure wash the filter.

DETAILED DESCRIPTION

Embodiments of the present invention thus provide a mixed fluid filtration system. The system will generally be described for in filtering grey water on-board an aircraft for aircraft non-potable reuse of the grey water. However, it should be understood that the functions and features described herein may be used in other filtration systems for any other type of mixed fluid.

Figures 1A, 1B:
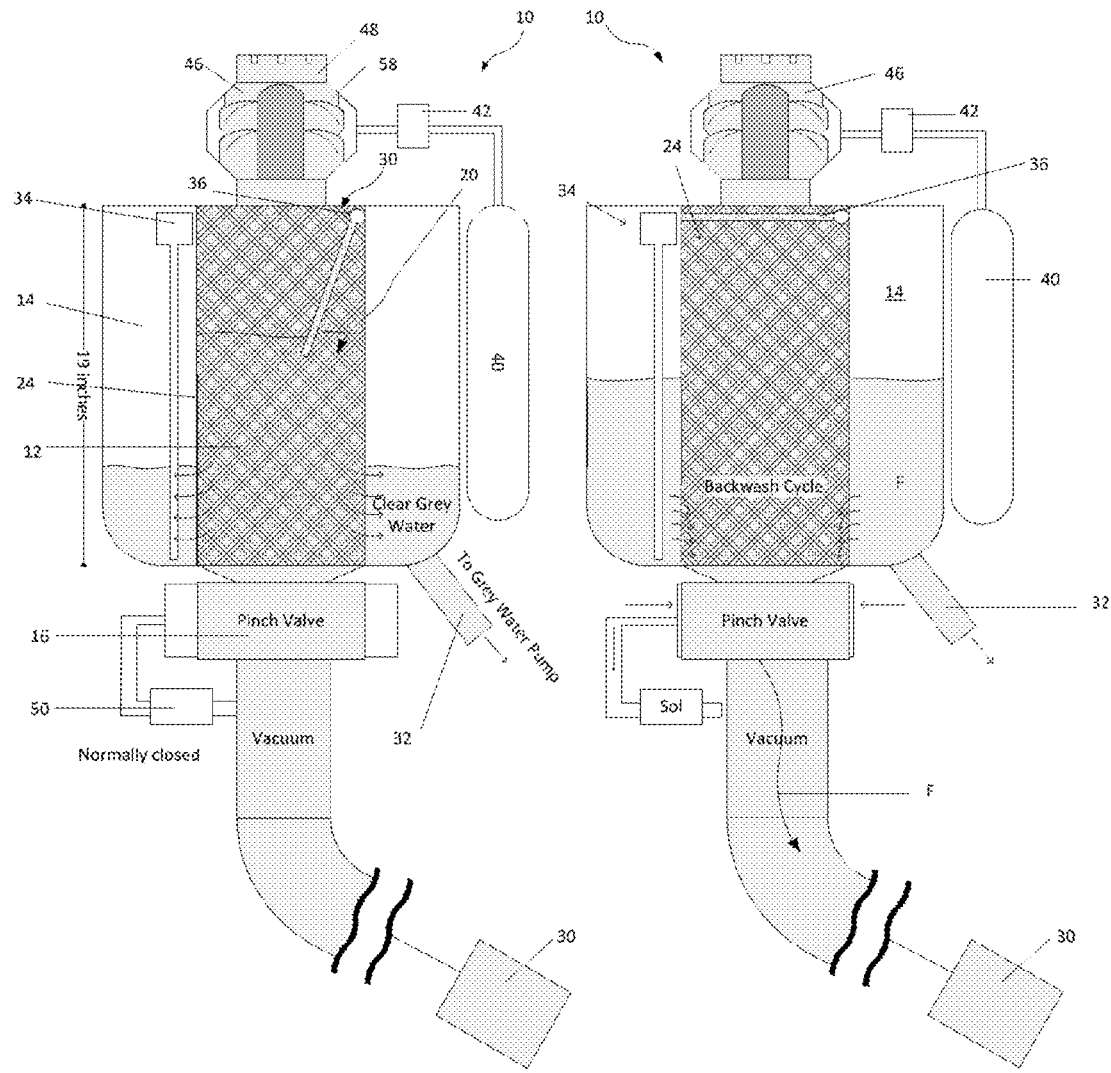
FIG. 1A shows a side schematic view of a filtration system in the fill position.
FIG. 1B shows a side schematic view of the filtration system of FIG. 1A in the backwash position.
Figure 2:
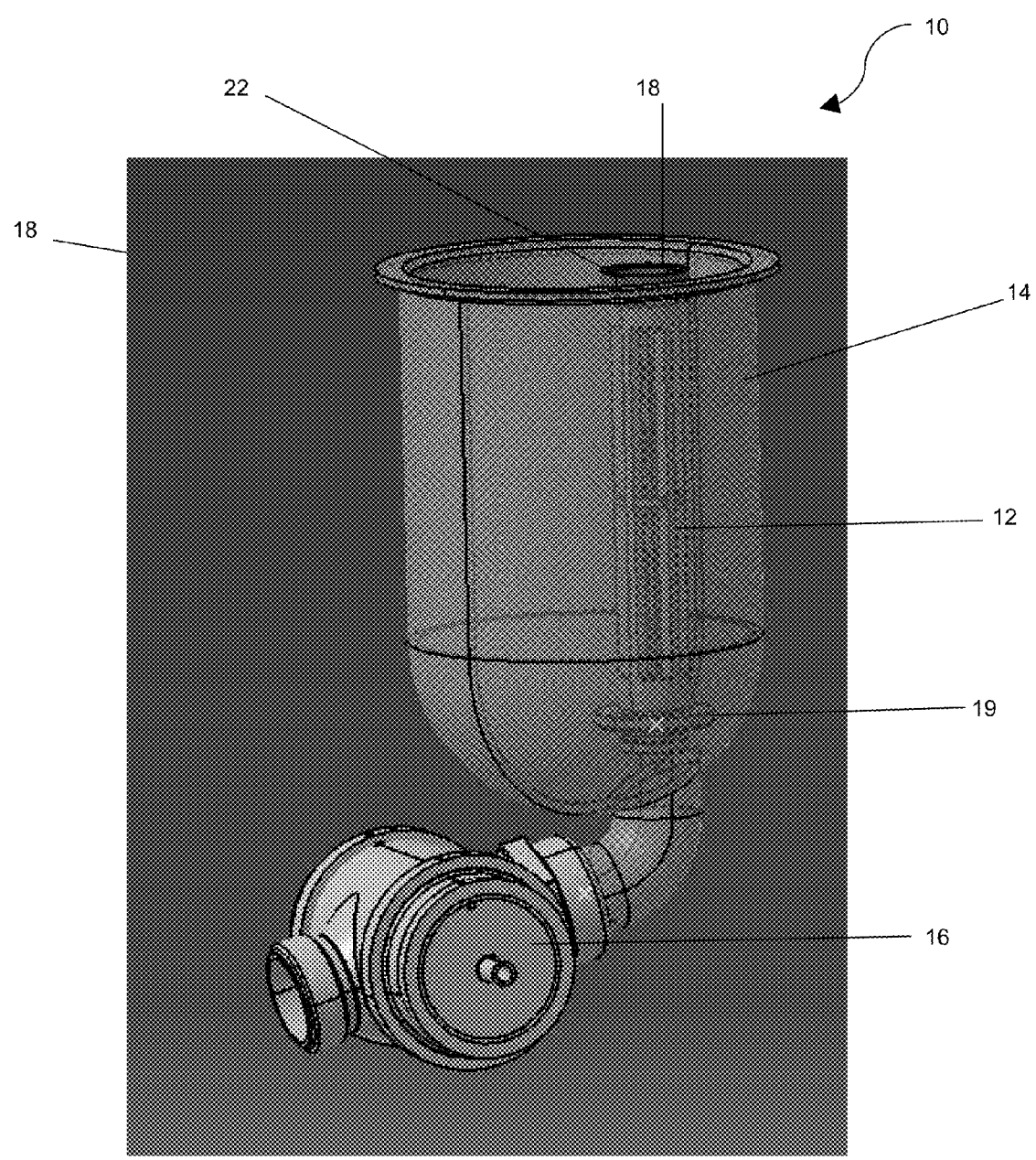
FIG. 2 shows a side perspective view of a filtration system, showing the fluid reservoir, filter support, and valve.
Figure 3:
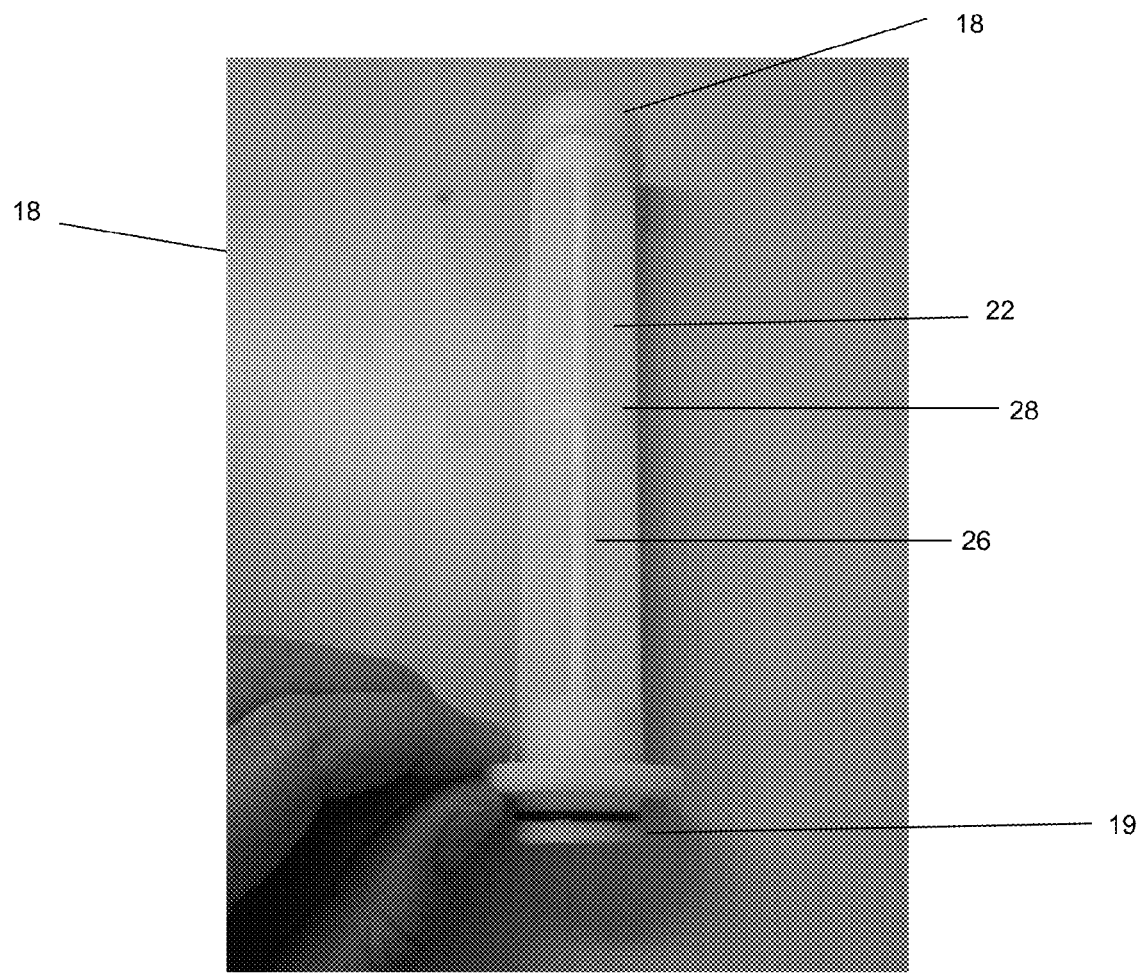
FIG. 3 shows a side view of a filter support according to one embodiment.

As shown in FIGS. 1-3, the mixed fluid filtration system 10 includes a filtering component 12, a fluid reservoir 14, and a valve 16 for controlling flow of water that is filtered by the mixed fluid filtration system 10. For example, the valve 16 may be in fluid communication with a vacuum waste tank 30. When the valve 16 is closed, the filtered water stored in the fluid reservoir 14 may be delivered to a holding tank or intermediate reservoir that may be used to store the filtered water for use in toilet flushing or for other on-board uses. This configuration is shown in FIG. 1A. When the valve 16 is open, as shown in FIG. 1B, the filtered water in the fluid reservoir 14 may be subjected to vacuum. This pulls the filtered water back in through the filtering component 12 to create a backwash for cleaning the filtering component. This inward flow is shown by arrows F, showing water flowing into the filtering component 12 and into the vacuum waste system 30.

Figure 7:
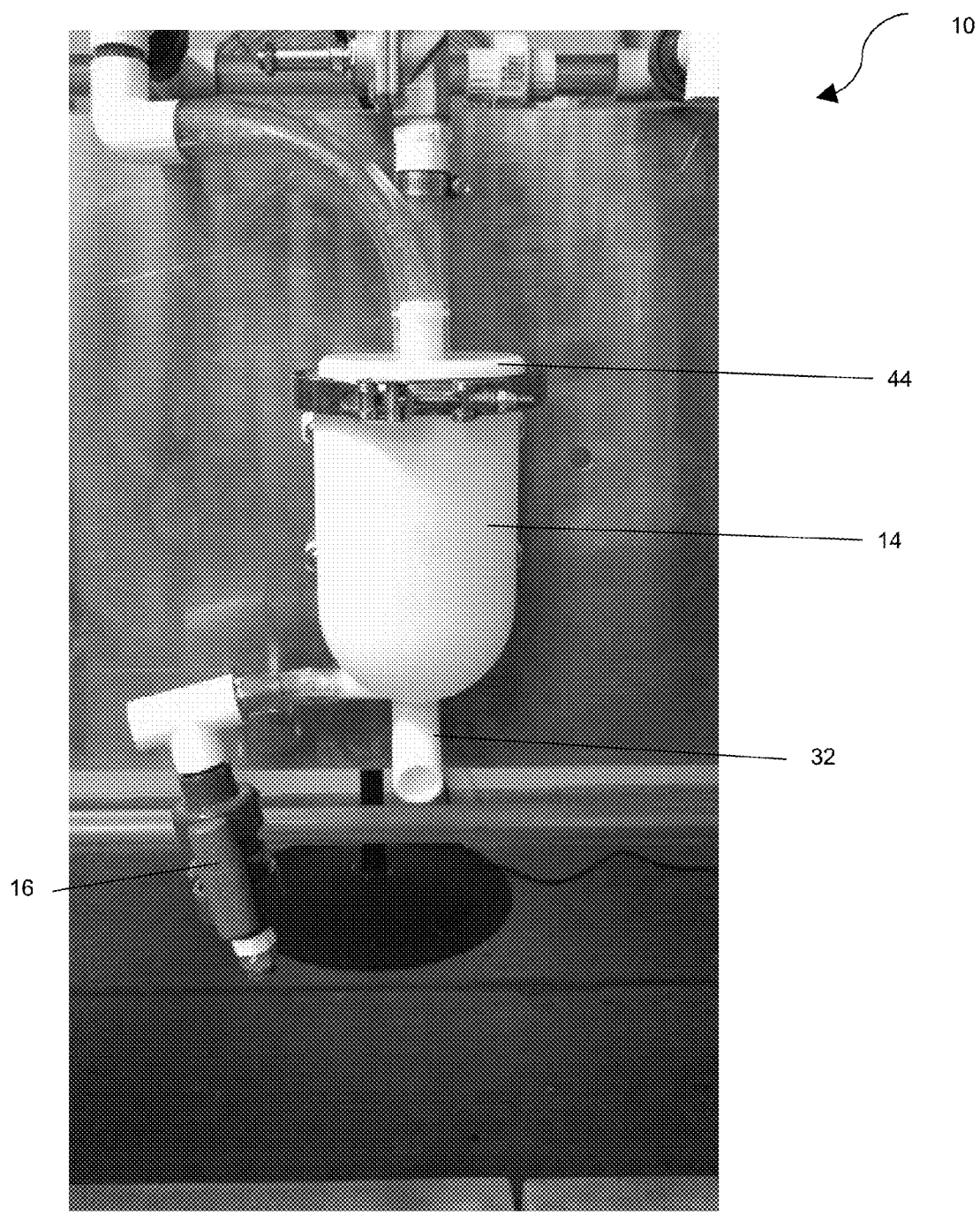
FIG. 7 shows a perspective view of a filtration system installed beneath an aircraft lavatory sink and configured to deliver filtered grey water to an aircraft lavatory toilet for flushing.
Figure 8:
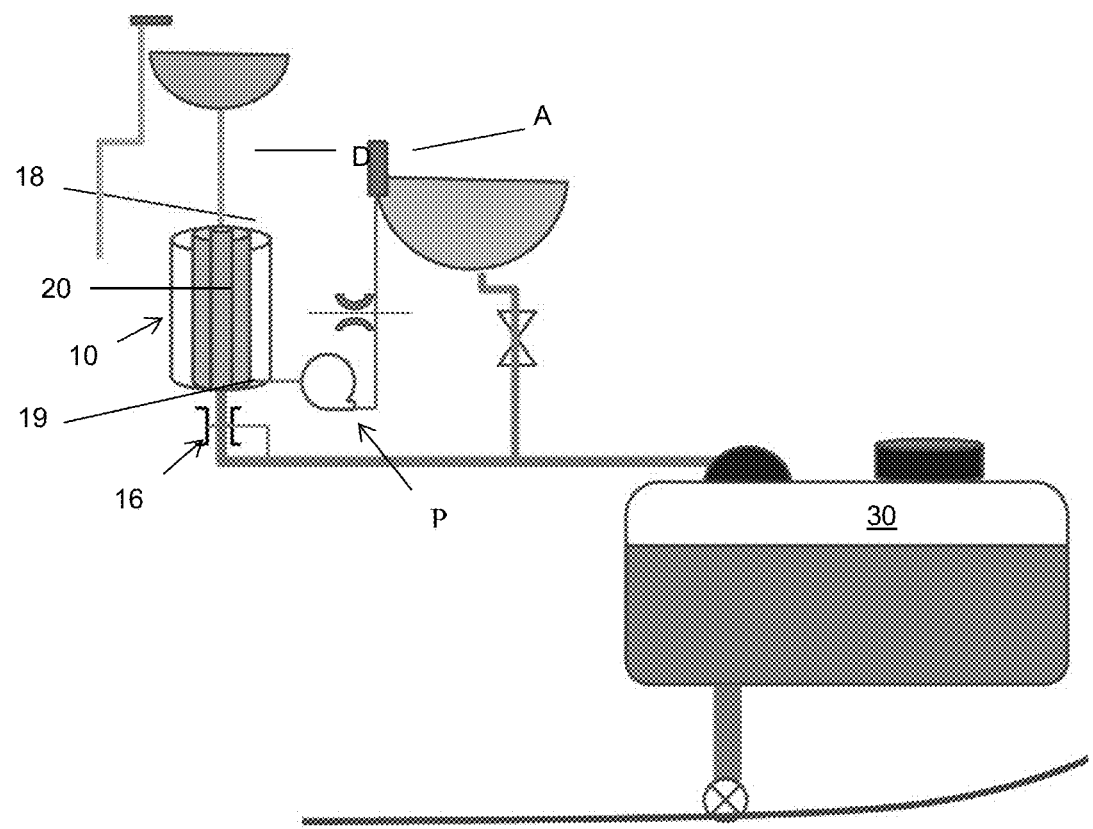
FIG. 8 shows a perspective view of a septic system using one example of a water capture and filtration system described herein.

Referring now more particularly to each component of the system 10, the filtering component 12 includes a filter support 22 and a filter media 24. FIG. 2 shows a filtering component 12 positioned in a fluid reservoir 14. The filter support 22 has a first end 18 that is configured to receive water from a mixed fluid outlet. One example of a complete installed system is shown in FIG. 7. In one embodiment, the mixed fluid outlet may be a drain of an aircraft sink basin. When used on-board an aircraft, the mixed fluid filtration system 10 collects and treats liquid discharge from sinks, other grey water production fixtures, or any other influent water chamber. After a passenger washes his/her hands, rather than having the spent grey water routed directly to the waste tank via the on-board vacuum waste system or routed overboard, the water can be captured and cleaned by the mixed fluid filtration system 10 in order to route the water for other uses. One example of use of the filtration system 10 is a complete septic system for re-use of the filtered water for toilet flushing is shown in FIG. 8.

Grey water enters the first end 18 of the filtering component 12 via gravity and is directed to the treatment chamber 20. In one embodiment, the first end 18 may be secured directly to a sink basin drain D or it may be secured to an intermediate component between the basin and the remainder of the filtration system 10. One or more sealing elements (such as o-rings) are generally used at the first end of the filtering component 12 in order to ensure a liquid tight seal and prevent leakage. Water may enter into a treatment chamber 20, which is a space that may be formed between the filter support 22 and a filter media 24. A second end 19 of the filter support 22 is configured to cooperate (typically indirectly via tubing) with a valve 16 that is in communication with the vacuum waste system.

One example of a filter support 22 is shown in FIG. 3. The filter support 22 is shown having one or more ribs 26 which function as support features. The ribs 26 may be formed as one or more protrusions from a central spine 28 of the filter support 22. The filter support 22 may be a rigid support structure or a dynamic and deformable structure. A deformable structure has the added benefit of temporarily accommodating a larger inrush of grey water or other mixed fluid into the treatment chamber 20, allowing more time for the water to pass across the filter media 24. This deformability may also help extend the filtering component 12 lifetime by loosening accumulated particulates from its various surfaces as the filter support flexes.

Figures 4A, 4B, 4C:
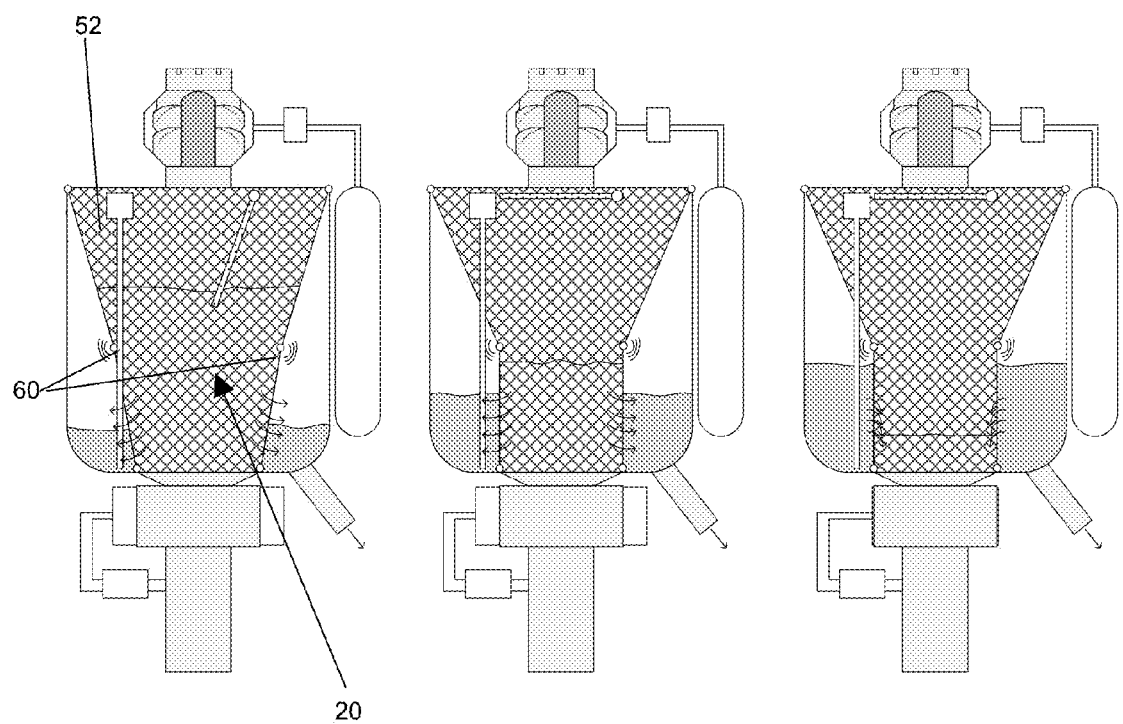
FIGS. 4A-4C show a filtration system having a deformable filtering component.

FIGS. 4A-4C shows a fluid reservoir 14 that is defined by a deformable filtering component 52. The deformable filtering component 52 adjusts the shape of the treatment chamber 20 depending on the prevailing conditions (pressure, water level) in the treatment chamber 20 and fluid reservoir 14. In one embodiment, deformability may be achieved by resistive hinges 60 and/or flexible gaskets on the filter support 22. These hinges 60 may allow the filter support 22 to flex inwardly or outwardly, depending upon the volume of the water column and thus, the pressures applied to the filtering component 12. In a preferable system, the filter media 24 is also deformable, such as a polymer or plastic or other material, that can flex and deform with the filter support 60.

A filter media 24 may be secured to the filter support 22. The structure of filter support 22 allows various different types of filter media 24 to be used therewith. Incoming mixed (or grey) water is driven through the treatment chamber 20 formed between the filter support 22 and the filter media 24, and driven across the filter media 24. The filter media 24 is designed to retain selected particle sizes from the incoming water, depending upon the filter media 24 type. In one embodiment, the filter media 24 comprises a metal or polymer filtration structure that retains particulate matter and reduces foam in the water. Other embodiments provide filters that may be paper-based, such as lab filter paper.

The filter media 24 may be formed as a screen or any sieve-like structure that filters out unwanted particles and debris. The filter media 24 may be designed to retain various particle sizes specific to the input liquid and the output requirements and to prevent them from passing out of the treatment chamber 20 and into the fluid reservoir 14. In one embodiment, the filter media 24 may include multiple stages of coarse to fine filter media. One specific example is a 500 micron filter followed by a 250 micron filter. The filter media 24 may be impregnated with silver or other antimicrobial metallic material to reduce the risk of microbial contamination and propagation. Additionally or alternatively, the filter media 24 may be coated with a combination of hydrophobic and/or hydrophilic materials to passively discriminate between water and surfactants. This may assist the migration of the treated/cleaned/filtered grey water through the filter media 24. The water is allowed to flow out from the filter media 24 into the fluid reservoir 14. Any undesired solids are generally filtered out and retained along an inner surface of the filter media 14, such that the water exiting the filtration component 12 is generally filtered, cleaned, or otherwise configured to be delivered to a use location for re-use.

The filter media 24 may be secured to the filter support 22 using any appropriate method. For example, the filter media 24 may be adhered to the filter support 22 via an adhesive, such as epoxy. Alternatively, an edge of the filter media 24 may be inserted into a lip formed on the filter support 22. Additionally or alternatively, the filter media 24 may be formed such that it slides over the filter support 22 and is secured in place via a cap or clip or other securing structure. Any other securing options are possible and considered within the scope of this disclosure.

The treated or filtered grey water is stored in the fluid reservoir 14 where it awaits use in non-potable water applications (or in potable drinking water applications if the filter treatment has been sufficient to render the water potable). The filtered fluid is held in the fluid reservoir 14 and is available for downstream use via a fluid connection. In use, the valve 16 remains is a normally closed position.

As shown in FIG. 1A, the normally closed valve 16 prevents the fluid reservoir 14 from being subjected to vacuum from the vacuum system 30. Valve 16 may be a pinch valve or any other appropriate valve 16 that creates an interface between the vacuum system and the treatment chamber 20 of the system 10. Valve 16 may be controlled via a solenoid or any other appropriate controlling system or mechanism. When the valve 16 is closed, water can be delivered out of the fluid reservoir 14 via outlet 32. Outlet 32 may deliver water to a filtered grey water pump or other filtered grey water reservoir.

In one embodiment, a level sensor system 34 may be provided in the mixed media filtration system 10 order to determine the water levels in the treatment chamber 20 (e.g., as the mixed water "waits" in the chamber prior to being forced out through the filter media 24) and/or in the fluid reservoir 14. One or more level sensors 34 may be used to communicate the availability of treated water or accumulation of influent fluid. Level sensors 34 may be comprise non-intrusive or intrusive sensors, such as capacitive sensors, ultrasonic sensors, pressure switches, float switches, any other appropriate level sensor, or any combination thereof. If fluid in the fluid reservoir 14 reaches a low level, a low level sensor may be activated to indicate that a re-fill is needed. The low level sensor may trigger a refill from the potable water system to ensure the availability of water for downstream use.

If fluid in the fluid reservoir 14 reaches a high level (which may be a pre-set high fluid level volume, based on the size of the reservoir 14 and other needs of the system 10), the reservoir 14 may be partially or fully emptied. This emptying may assist in preventing overflow or back-up into the basin or other influent water location. The emptying process may also assist in cleaning the filter media 24. A high level sensor may trigger a full or partial emptying process to the vacuum waste system 30 to ensure that the reservoir 14 does not overflow. The level sensing and control of the fluid reservoir 14 are generally automated in the aircraft environment. In other embodiments, power may not be accessible and the sensing and control can be controlled by other means. For example, level switches such as float switches may be used to detect fluid level, and any emptying and refilling of the reservoir may be accomplished manually.

If the system 10 is installed for use in collecting grey water from a sink basin on an aircraft, the filtered water being held in the fluid reservoir 14 may be delivered to a filtered grey water holding tank for use in flushing the vacuum toilets or other uses on-board. However, if those uses are not required and excess water builds up in the fluid reservoir 14, then filtered water in the reservoir 14 may be delivered to the aircraft vacuum waste system during a partial or full emptying process of the fluid reservoir 14. This emptying process also functions as a filtering component 12 cleaning process. Any particles retained by the filtering component 12 and/or on an inner surface of the filter media 24 may be disposed of (and consequently, the filtering component 12 may be cleaned) via backwashing fluid from the fluid reservoir 14 into the vacuum waste system 30. Additionally, at least a partial emptying process may be activated periodically in order to clean the filtering component 12, even if the level sensors 34 do not indicate a high level.

Figure 6:
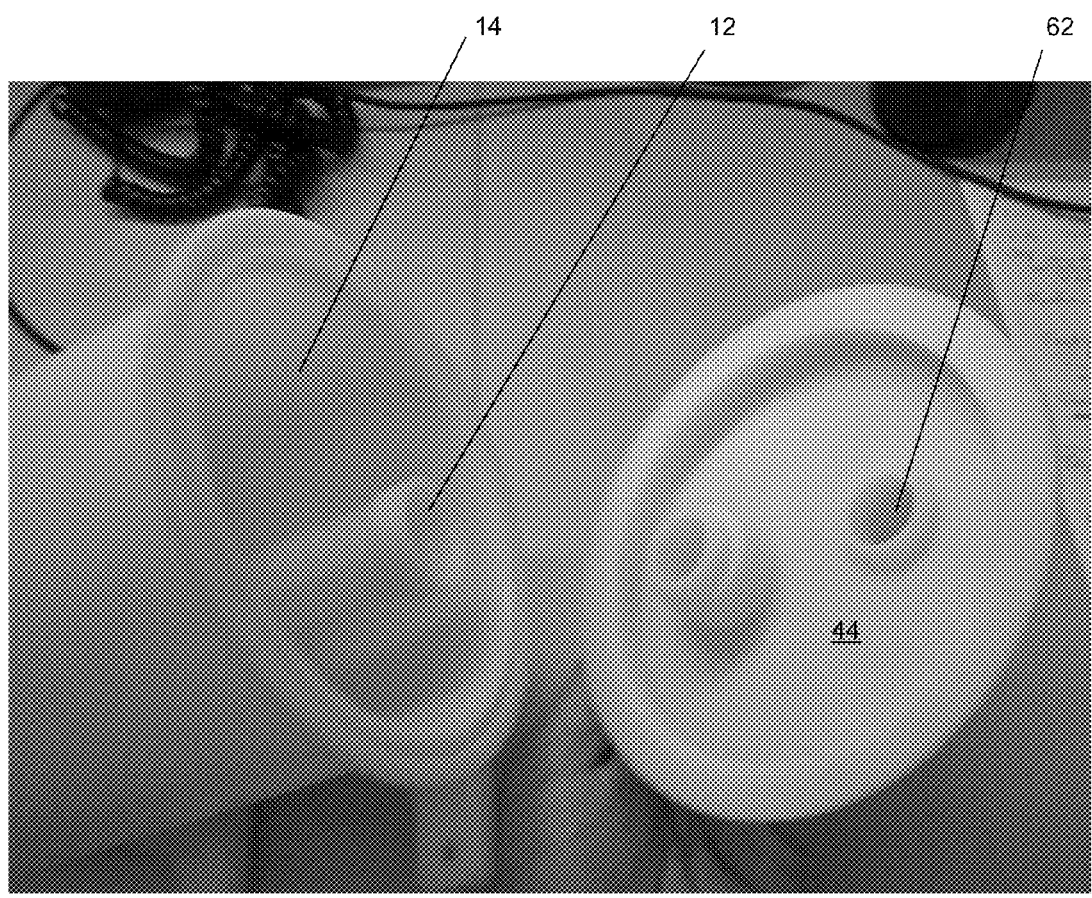
FIG. 6 shows a perspective view of a fluid reservoir and lid.

For example, accumulation of particulate matter and foam in the treatment chamber 20 and on the filter media 24 is addressed by periodically flushing the contents into the vacuum waste system 30 while backwashing the filtering component 12. A backwash of the filtering component 12 is accomplished using the remaining treated water present in the fluid reservoir 14 and the pressure differential. In use, the valve 16, which is normally closed, is allowed to open. The valve 16 operates as the controlled interface to the vacuum waste system 30. Additionally, an inlet restrictor 36 located at the inlet 30 to the mixed fluid reservoir 14, closes during the backwash cycle as shown in FIG. 1B. This keeps air from entering on the fouled side of the filtering component 12, and instead directs air backwards across the filtering component 12 via a vent 62 in the fluid reservoir 14. One example of such a vent 62 is shown in FIG. 6. This vent 62 may act as an inlet for air to enter the fluid reservoir 14. It may vent to the atmosphere or it may cooperate with an odor-control device to clean any air that may vent out.

The movement of air drawn by the vacuum waste system 30, dislodges accumulated particulates and cleans the filtering component 12. This cycle is triggered when the fluid level in the fluid reservoir 14 is high, and/or at a given interval for periodic filter cleaning. For example, at least a partial emptying process may be activated via a time-based system (i.e., every 2 hours) or via a flush-based system (i.e., every 100 flushes) or via a volume-based system (i.e., every time 20 or more gallons of water have been filtered) or any other appropriate indicator to ensure that the filtering component 12 is cleaned, even if a high fluid level is never reached in the reservoir 14 due to consistent end uses of the filtered water contained therein.

The valve 16 and inlet restrictor 36 generally require power and operate automatically in an aircraft setting. In the environment without access to a vacuum waste system or to power, the valves and backwashing may be achieved manually.

Escape of gaseous odors from grey water or other mixed fluid is a concern for aircraft passengers and crew or any other users. Unpleasant odor can be addressed by the delivery of chemical additives and/or biocides, which may be housed in a chemical additive unit 40. For example, a chemical destabilizer comprised of Enviroclean or a chemical with similar properties may be added periodically to prevent reservoir and toilet bowl staining and to improve filtration performance. A delivery system for the additives to the fluid reservoir 14 may use a metered pump 42. In one embodiment, the chemical supply may be provided in a replaceable additive unit 42. Replacement may be accomplished, for example, by removing the storage unit and replacing the input line. In another embodiment, the additive unit 40 may be refillable.

Odor may also be reduced by providing an odor-absorbent and/or odor-adsorbent liner in the lid 44 of the fluid 14 reservoir. Certain materials, such as activated carbon felt, absorb constituents from the air around the mixed fluid which contribute to foul odor. Reducing the concentrations of these contaminants in the air can help minimize this odor. Odor emanation may be further prevented with an odor-control 46 device positioned between the sink discharge point and the fluid reservoir 14. This device 46 may provide a one-way check to allow the passage of liquids under the force of gravity, while preventing the upward passage of any gasses or foams. One such device 46 may be comprised of an elastomeric skirt structure 58. The weight of the incoming mixed fluid pushes the elastomeric skirts 58 aside as the fluid flows into the fluid reservoir 14. The skirts return to their initial position once the weight of the fluid has passed, blocking any outflow of gases, foams, or fluid.

Figure 5:
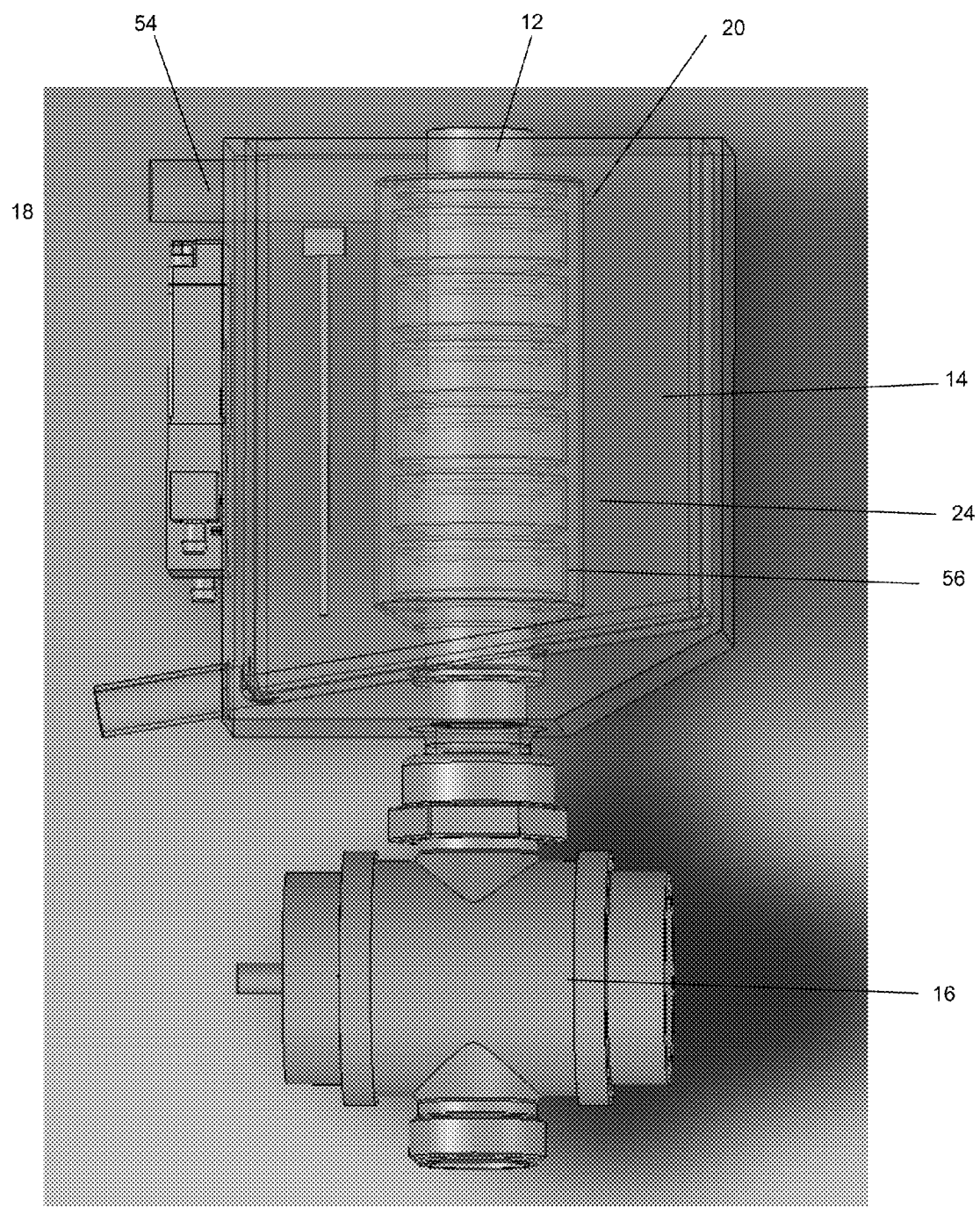
FIG. 5 shows a side plan view of one embodiment for configuring an air intake for a filtration system.

A further embodiment shown in FIG. 5 may include an air intake tube 54 in fluid communication with the fluid reservoir 14. The air intake tube 54 may be necessary in order to equalize the environment in the reservoir 14. Because a strong vacuum is applied to the reservoir 14, there must also be a way to replace the air into the reservoir 14. An air intake tube 54 is thus provided.

In one configuration, an additional component surrounding the filter cartridge could act to improve the backwash process by concentrating the airflow and controlling its velocity to ensure its efficacy. This component generally could be a cylinder, or another shape that would surround the filter cartridge to direct airflow evenly around the filtration surface. An inlet vent may be plumbed to the outside of the filtration reservoir 14 to serve as a source of incoming airflow. The outlet may be a hole or series of holes that direct air across the filtration media 24. The outlet may be any shape such as circular, elliptical, rectangular.

The specific embodiment shown in FIG. 5 features a spiral cage 56 that functions as this additional component. Spiral cage 56 extends down the filtering component 12, within the treatment chamber 20. This embodiment uses the air that is pulled in through the air intake tube 54 and directs the air in a downward spiral fashion so that the air can also help clean the filter media 24 during the cleaning/backwash process.

In one embodiment, the mixed fluid filtration system 10 is constructed from plastic materials to achieve the low weight required for aircraft applications. A specific design of the system 10 designed for aircraft usage may be about five pounds, including valves, sensors, and controllers. The size of the system 10 is dictated by the space envelope available in the lavatory and/or galley structure into which the system 10 is to be installed, at the point of use of the filtered fluid. The storage volume within the fluid reservoir 14 is kept to a minimum in order to reduce the residence time of collected water and to lower the risk of microbial propagation. One example of an internal volume of the reservoir 14 designed specifically for aircraft lavatories is about one gallon, but it should be understood that the system 10 and related fluid reservoir 14 can be designed to meet the collection needs for other applications of the system 10. The reservoir may be larger or smaller if desired.

Maintenance of the system 10 may be addressed by using an installation comprising quick-release interfaces and a hinged support structure allowing ease when pivoting the mixed fluid filtration system 10 from its installed position to a maintenance position. Once engaged in the maintenance position, an airtight lid 44 can be removed from the top of the fluid 14 reservoir which exposes and allows the removal and replacement of the filtering component 12. This process may be aided by a number of maintenance features comprising handles and quick-release latches, which are generally known to those of ordinary skill in the art and need not be described further herein.

A further sensing system may be provided in order to detect when the filtering component 12 has reached the end of its useful lifetime. For example, at least one level sensor may be fixed such that it can measure the height of the fluid in the treatment chamber 20. Water may accumulate in the treatment chamber 20 as it waits to pass through the filter media 24. At least one other sensor measures the height of fluid in the fluid reservoir 14. When the filtering component 12 blocks fluid passage to the point that the influent level in the treatment chamber 20 is a predetermined amount higher than the storage level in the fluid reservoir 14, even after a backwash, the sensing system will indicate that the filtering component 12 (or the filter media 24 portion of the filtering component 12) needs to be replaced. This indication can be in a form such as a light or display, or it may communicate with the overhead system and/or operator.

A method for use of the system 10 is now provided. FIG. 1A shows the mixed fluid filtration system 10 in a filling configuration. The sink discharges grey water through a coarse grill or grate that functions to keep large items out of the fluid reservoir 14. The grey water then passes through an odor-control cartridge 46. The weight of the grey water pushes the elastomeric skirts 58 aside as it cascades through the cartridge 46. The skirts return to their initial position once the weight of the water has passed. Grey water then pushes the inlet restriction 36 aside as it pours into the fluid reservoir 14. The inlet restriction 36 may be provided as a dynamic hinged check.

The pressure of the water in the treatment chamber 20 creates a pressure that pushes the grey water across the filtering component 12, and particularly across the filter media 24. The filter media may be a hydrophobic/philic membrane, leaving any particulate matter and soaps behind (on the inner surface of the filter media 24). Once the level sensor 34 has determined that a sufficient volume of filtered grey water has accumulated, the water can be delivered to a use location from the fluid 14 reservoir via outlet 32. In one embodiment, the fluid is delivered to an aircraft vacuum toilet for flushing.

FIG. 1B shows the mixed fluid filtration system 10 in a backwashing configuration. To flush the contents of the fluid reservoir 14, the system opens a solenoid 50, exposing the pinch valve 16 to vacuum and forcing it open. This vacuum action pulls the contents of the treatment chamber 20 into the vacuum waste system 30, pulling the filtered grey water backwards across the filter media 24 and into the filtering component 12. This action backwashes the filtering component 12 and renders it cleaned for the next use.

In one aspect, there is a system for filtering grey water and for delivering the filtered gray water that is cleaned and captured to flush a vacuum toilet. FIG. 8 illustrates an overall view of one exemplary use of the system. To connect the filtered grey water to the existing toilet, the use of a water pump "P" and an accumulator "A" fitted with a rinse valve may be provided. Filtering of the grey water may be accomplished with a cylindrical filter that is housed in a canister. The grey water comes in through the center of the filter. When a grey water interface valve 16 is closed, the water pump P creates a pressure differential across the filter to facilitate filtration. The water pump P also pumps filtered water into an accumulator A in preparation for the next flush. As flush is required, the outlet valve of the accumulator A opens to discharge rinse water captured in the accumulator A.

With the grey water interface valve 16 open, the filter reject (including debris, hair, solids, soap, etc.) can be evacuated through the grey water interface valve 16 into the waste system 30. Opening of the grey water interface valve 16 also facilitates a back wash of the filter using the filtered water.

An example of an alternate use for the filtration system 10 described is in an environment where potable water is not available. In such a scenario, a vacuum system may similarly not be available. The system could then be operated manually to filter and treat the water of non-potable quality in order to provide potable water for drinking.

In order for manual operation of the system 10 to occur, a pressure differential between the filtered water (outside the treatment chamber 20) and the grey water inside the treatment chamber must be effected. In the absence of a vacuum (which can create the desired pressure differential), an alternate method may be used. For example, in one alternate, a pressure bulb may be provided on the filtered side of the water to increase the pressure differential across the filter media 24. Once the pressure is greater on the filtered water side, the filtered water may be caused to move back through the filtering component, creating the desired backwash. Another option may be to manually displace the water across the filtering component, for example, via a pressure system or a strong water flow. In these embodiments, rather than moving from ambient to vacuum, the backwash may be created by moving from a high pressure system to ambient.

Changes and modifications, additions and deletions may be made to the structures and methods recited above and shown in the drawings without departing from the scope or spirit of the invention and the following claims.

What is claimed is:

1. A mixed fluid filtration system for use with a vacuum waste system and for treating water leaving a sink basin outlet, the mixed fluid filtration system comprising:
   a fluid reservoir;
   a first fluid reservoir outlet in fluid communication with a valve leading to the vacuum waste system;
   a second fluid reservoir outlet leading to a water use location;
   a filtering component positioned within the fluid reservoir, comprising:
   i. a filter support having a first end secured directly or indirectly via tubing to the sink basin outlet and a second end secured directly or indirectly via tubing to the first fluid reservoir outlet and the valve leading to the vacuum waste system;
   ii. a filter media annularly surrounding the filter support, forming a treatment chamber between the filter support and the filter media;
   wherein mixed fluid delivered to the treatment chamber is driven across the filter media and into the fluid reservoir;

wherein the valve leading to the vacuum waste system has a normally closed position and is actuable to an open position for delivering vacuum to the filtering component to clean the filter media or for discharging the fluid reservoir to a vacuum waste system.

2. The system of claim 1, wherein the sink basin outlet comprises a drain of an aircraft sink.

3. The system of claim 1, wherein the filter support comprises one or more ribs that support the filter media positioned around the filter support.

4. The system of claim 1, wherein the filter media comprises a polymeric mesh filter.

5. The system of claim 1, wherein the vacuum waste system is the vacuum waste system on-board a passenger aircraft.

6. The system of claim 1, wherein the vacuum waste system pulls filtered water from the fluid reservoir in through the filter media in order to clean an inner surface of the filter media, to remove excess filtered fluid from the fluid reservoir, or both.

7. The system of claim 1, further comprising one or more sealing elements at the first end of the filter support, the second end of the filter support, or both.

8. The system of claim 7, wherein the one or more sealing elements comprise o-rings.

9. The system of claim 1, further comprising one or more level sensors.

10. The system of claim 1, wherein the valve comprises a solenoid-operated pinch valve.

11. The system of claim 1, wherein the filtering component further comprises a spiral cage for improved airflow during the open valve position.

12. The system of claim 1, wherein the filtering component comprises a deformable treatment chamber.

13. The system of claim 1, wherein the use location comprises an aircraft toilet flush system.

14. The system of claim 1, further comprising an additive unit in fluid communication with the fluid reservoir.

15. The system of claim 1, further comprising a lid of the fluid reservoir comprising one or more odor-control devices.

16. A method for cleaning a filter of the filtration system of claim 1 in fluid communication with a vacuum system, comprising:
(a) delivering water to be treated to the filtration system;
(b) allowing the water to flow through a treatment chamber of a filtering component of the filtration system and to pass into a fluid reservoir as treated water;
(c) delivering vacuum from the vacuum system to the filtering component in order to cause water that has passed into the fluid reservoir to pass back into the filtering component and into the vacuum system.

17. The system of claim 16, further comprising a valve that controls flow of the vacuum and
(d) maintaining the valve in a normally closed position in order to allow the treated water to be delivered to a use location; and
(e) opening the valve to cause delivery of the vacuum to the filtering component.

18. A mixed fluid filtration system for use with a sink basin, the system, comprising:
(a) a filtering component, comprising:
 i. a filter support having a first end secured directly or indirectly via tubing to the sink basin and a second end secured directly or indirectly via tubing to a fluid reservoir outlet;
 ii. a filter media annularly surrounding the filter support; and
 iii. a treatment chamber formed between the filter support and the filter media;
(b) a fluid reservoir housing the filtering component, wherein mixed fluid delivered to the first end of the filter support flows into the treatment chamber and is driven across the filter media, into the fluid reservoir for storage;
(c) the outlet of the fluid reservoir separate from and non-communicable with the filtering component, for delivering filtered water stored in the fluid reservoir to a use location; and
(d) a pressure differential system in fluid communication with the fluid reservoir outlet for creating a pressure differential across the filter media, wherein creating the pressure differential causes filtered water in the fluid reservoir to pass back into the filtering component treatment chamber for cleaning the filter media.

19. The system of claim 1, wherein the sink basin outlet, the first end of the filter support, and the first fluid reservoir outlet are oriented along the same vertical axis.

20. The system of claim 1, further comprising an inlet restrictor located at an inlet of the fluid reservoir.

* * * * *